Patented Aug. 5, 1930

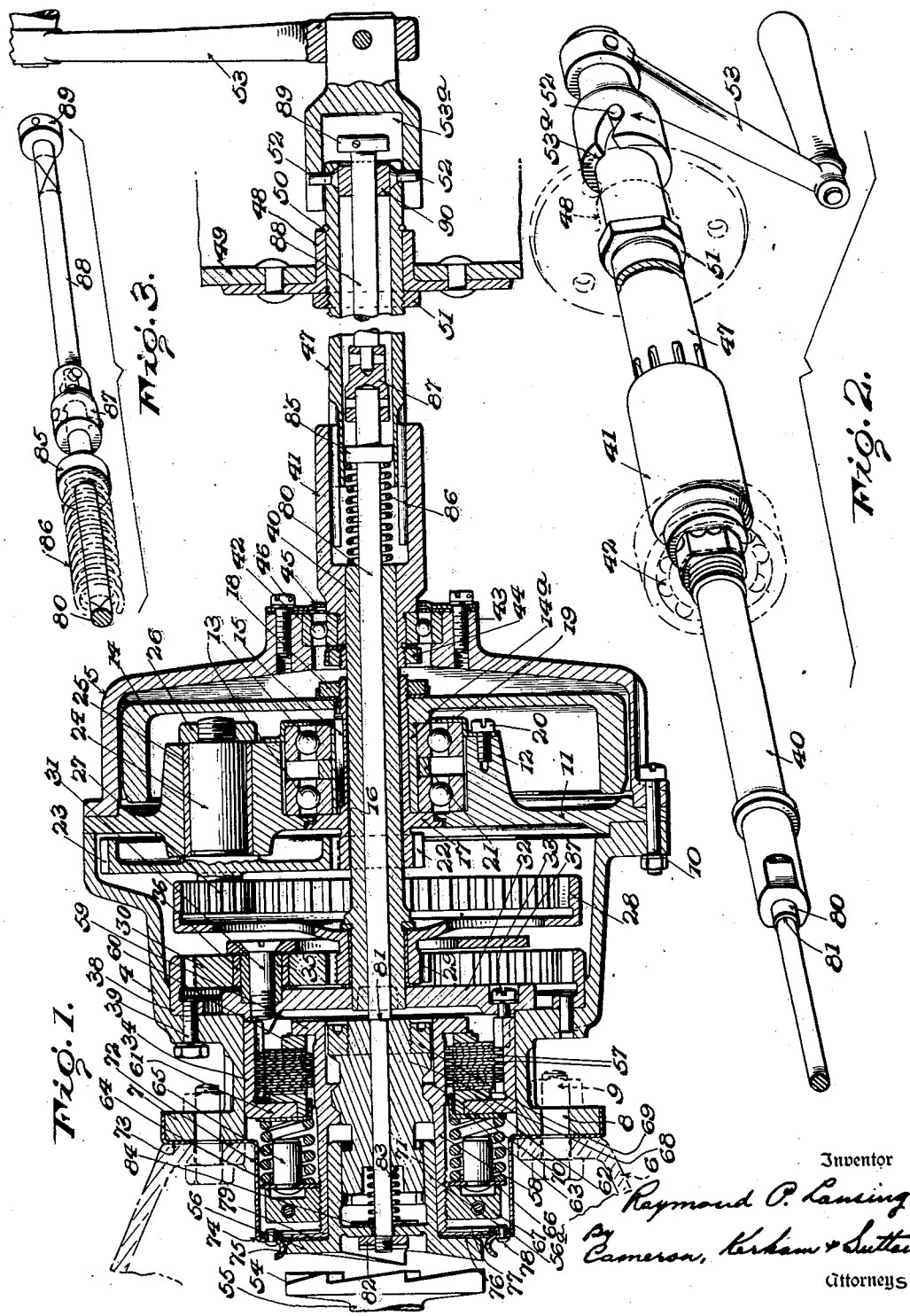

1,772,151

UNITED STATES PATENT OFFICE

RAYMOND P. LANSING, OF MONTCLAIR, NEW JERSEY, ASSIGNOR TO ECLIPSE MACHINE COMPANY, OF ELMIRA HEIGHTS, NEW YORK, A CORPORATION OF NEW YORK

ENGINE-STARTING MECHANISM

Application filed October 12, 1928. Serial No. 312,162.

This invention relates to starting mechanism for internal combustion engines and more particularly to engine starters of the inertia type.

An object of the present invention is to provide an inertia starter of the concentric type embodying novel actuating means operable at a point in the rear of and at a distance from the starter. For example, when the starter is applied to an aeroplane engine said means are adapted to be actuated from the cock pit of the aeroplane.

Another object is to provide novel means for operatively connecting the starter to the engine whereby the energy stored in the flywheel of the starter is rendered effective to start the engine.

A further object is to provide novel cranking and meshing means for an engine starter, said means being so constituted that the meshing mechanism cannot be actuated during the cranking operation.

One embodiment of the present invention is illustrated in the accompanying drawings wherein like reference characters refer to like parts throughout the various views. It is to be expressly understood, however, that the drawings are for purposes of illustration only and are not to be construed as a definition of the limits of the invention, reference being had for this purpose to the appended claims.

In the drawings,—

Fig. 1 is a longitudinal, axial sectional view illustrating one embodiment of the present invention;

Fig. 2 is an enlarged detailed perspective of one form of cranking and meshing mechanism which may be employed in accordance with the invention; and Fig. 3 is a perspective view of a portion of the meshing apparatus shown in Figs. 1 and 2.

The novel cranking and meshing mechanism of the present invention is illustrated in combination with an inertia starter which, in the form shown, comprises a cylindrical housing constituted by an inner section 4 and an outer section 5. The inner section of the housing is adapted to be secured to an internal combustion engine, a portion of the crank case of the latter being diagrammatically illustrated at 6, and for this purpose is provided with a flange 7 having suitable openings 8 to receive bolts 9 for mounting the starter in operative position. The outer section 5 is secured by means of bolts 10 to the inner housing section, the bolts passing through openings in suitable flanges or lugs provided on the adjacent ends of said sections.

A diaphragm 11 is clamped between the flanges of sections 4 and 5 by the bolts 10 and is provided centrally thereof with a laterally projecting boss 12 in which are mounted two ball bearings 13 for rotatably supporting a flywheel or inertia member 14 of the small diameter, high speed type. The laterally extending hub 14ª of the flywheel is surrounded by and drivably connected as by means of a key 15 to a hollow shaft 16 that is held against longitudinal movement relative to said flywheel as by means of a flange 17 and a nut 18, provided with a lock washer, that is threaded onto the outer end of said shaft and abuts against the outer face of the flywheel. A retaining disc 19 which is secured to boss 12 by screws 20 is provided for bearings 13 and the bearings are maintained in spaced relation in boss 12 by means of a ring 21 which surrounds hub 14ª and engages adjacent faces of the inner races of said ball bearings.

Means are provided for rotating the flywheel at high speed whereby energy may be stored therein for starting the engine. As shown, the inner end of the hollow shaft 16 is provided with a pinion 22 that meshes with a spur gear 23 drivably connected in any suitable manner to a stub shaft 24 that is rotatably mounted by means of a bushing 25 in diaphragm 12. The outer end of shaft 24 carries a nut 26 to prevent longitudinal movement of said shaft relative to the diaphragm. Formed integrally, or otherwise suitably attached, to the inner end of shaft 24 closely adjacent gear 23 is a pinion 27 which meshes with an internal spur gear 28 that is formed integrally with a pinion 29 constituting a sun gear for a plurality of planetary gears, one of which is shown in cross section at 30.

Each of the planetary gears 30 is rotatably mounted on a screw 31 that is threaded into the outer face of a disc 32 secured by screws 33 to the outer end of a cylindrical member 34 which is rotatably mounted in housing section 4 closely adjacent the plane of flange 7. Each of the screws 31 carries a sleeve 35 which extends into a recess in the outer face of disc 32, and surrounding each sleeve is a bushing 36 for the associated planetary gear. In the form shown, three planetary gears are preferably employed and the three screws 31 carry on their outer ends a ring 37 for maintaining the sleeves, bushings and gears in operative relation. An internal spur gear 38 is secured to housing section 4, by means of screws 39, in a position to surround and mesh with the planetary gears 30.

Drivably connected in any suitable manner to the ceinter of disc 32 is a hollow cranking shaft that is preferably formed of a plurality of sections. The inner section 40 of said shaft constitutes a bearing member for the sun gear 29 and internal spur gear 28, the latter being mounted on said section 40 closely adjacent disc 32. The intermediate portion of section 40 extends freely through hollow shaft 16 and carries on its outer end a sleeve 41 that is rotatably supported as by means of a ball bearing 42 in a boss 43 formed centrally in the end wall of housing section 5. The inner end of sleeve 41 is of reduced diameter and is threaded to receive a nut 44 which constitutes a retainer for the inner race of the ball bearing 42. A retainer disc 45 which is secured to the outer end of boss 43 by screws 46 is also provided for bearing 42.

Sleeve 41 is interiorly splined to receive the splined end of the outer or cock pit section 47 of the cranking shaft whereby sections of the cranking shaft may be readily disassembled and yet are drivably connected. The outer end of section 47 is rotatably supported by means of a flanged bearing member 48 secured to the instrument board 49 or other suitable support provided in the cock pit of the aeroplane. Movement of section 47 inwardly relative to sleeve 41 is prevented by means of a lock ring 50 carried by said section in a position to engage the outer end of bearing member 48, and movement of said section outwardly, relative to sleeve 41, may be prevented by means of a nut 51 threaded on the section in a position to engage the inner face or end of bearing member 48. A pair of diametrically disposed pins 52 project radially from the outer end of cranking shaft section 47 to receive a hand crank 53 which is removed and stowed away when the starter is not being actuated.

Rotation of the hand crank is effective through section 47, sleeve 41 and section 40 to rotate the barrel constituted by cylindrical member 34 and disc 32. The rotation of the barrel is imparted to the planetary gears 30, sun gear 29, spur gear 28, pinion 27, spur gear 23, pinion 22, and thence to the flywheel 14. Due to the step-up train of gearing employed, the flywheel is rotated at a very high rate of speed whereby energy is stored therein for cranking the engine.

Means are provided for imparting the energy stored in the flywheel to the engine, whereby the latter is started. For this purpost there is provided a clutch jaw 54 that is drivably connected to the engine crank shaft 55, or an extension thereof, which jaw is adapted to be engaged by a similar jaw 56 adapted to be driven by the flywheel. Normally, jaw 56 is maintained out of driving engagement with jaw 54 by means to be described more fully hereafter.

If the energy of the rapidly rotating flywheel be applied to the engine crank shaft through rigid connections, damage to the starter parts would result. Accordingly, yielding means are provided intermediate the barrel 32, 34 and the jaw member 56 whereby slippage may occur between said jaw member and the barrel when the two jaws are drivingly engaged and until the engine crank shaft has been brought up to the speed of jaw 56.

In the form shown the yielding means is constituted by a friction clutch of the multiple disc type comprising a plurality of annular discs 57 positiond within cylindrical member 34, a number of said discs being splined on their outer peripheries to the inner surface of member 34, and in interleaving relation with the remaining discs which are splined on their inner peripheries to an interiorly threaded nut or sleeve 58. The outer end of the latter is provided with a flange 59 and intermediate said flange and the adjacent clutch disc is a thrust ring 60. Member 34 is provided with an inwardly extending flange 61 and intermediate the latter and the adjacent clutch disc is a thrust ring 62. Bearing against the inner face of flange 61 is a washer 63 that is engaged by a plurality of coil springs 64 which are disposed substantially parallel to sleeve 58 and are maintained in proper spaced relation by means of pins 65 that extend within the springs and are rigidly attached to a ring 66 which freely surround the inner end of sleeve 58. An adjusting nut 67 is threaded onto the outer end of sleeve 58 for engagement with ring 66.

By adjusting the position of nut 67 relative to sleeve 58 the compression of springs 64 is varied and the frictional engagement of the clutch discs is accordingly varied by flange 59 and thrust ring 60 which tend to force said discs more closely into engagement with thrust ring 62 and flange 61 of the barrel. Positioned within sleeve 58 and adapted for longitudinal and rotary motion relative thereto is a threaded shaft 68 which carries on its outer end a stop nut 69 adapted to engage a shoulder 70 formed interiorly of sleeve 58. The inner end of shaft 68 is longitudinally splined as at 71 to drivably engage the inner splined surface of the hub portion 56ª of clutch jaw 56. Shaft 68 is adapted for rotary and longitudinal movement to the left relative to sleeve 58 until nut 69 engages shoulder 70 and thereafter the sleeve, shaft and jaw member 56 rotate in unison and transmit torque from the clutch to the jaw member 54 on the engine crank shaft.

Seepage of oil from the engine crank case into the starter housing impairs the operation of the starter. Accordingly, oil sealing means are provided for the engine end of the starter comprising a cup-shaped member 72 which is preferably formed of light metal and is provided with a flange 73 that is bent around the periphery of flange 7, the flange 73 being clamped between the engine crank case and flange 7 by means of the bolts 9. Member 72 is bent inwardly at 74 to provide an annular shoulder and the inner end of said member is curved as at 75 to form a flange which surrounds jaw member 56 when the latter is in demeshed position. Attached to the inner face of shoulder 74 is an annular flexible washer 76 that is preferably formed of leather, the washer being secured in position by means of a ring 77 and a plurality of rivets 78 which extend through said ring, washer and shoulder. Interposed between washer 76 and the adjacent inner end of sleeve 58 is a metal ring 79, and shoulder 74 is so positioned that ring 79 holds washer 76 flexed inwardly into close engagement with the adjacent face of jaw member 56. The inner periphery of the washer 76 bears against the outer surface of hub portion 56ª.

Means are provided for moving jaw 56 into driving engagement with jaw 54 after sufficient energy has been stored in the flywheel 14 to start the engine. For this purpose there is provided a concentrically disposed rod 80 which slidably extends through jaw 56, threaded shaft 68 and cranking shaft section 40. Intermediate its ends rod 80 is provided with a shoulder 81 which normally bears against the outer end of threaded shaft 68. The inner end of rod 80 extends loosely through a central opening in jaw 56 and threaded onto said inner end is a nut 82 which abuts against the inner face of the hub of said jaw. Interposed between threaded shaft 68 and the hub of jaw 56 is a coil spring 83 which surrounds rod 80 and bears at its inner end against a pair of washers 84, the inner one of which is preferably formed of some flexible material such as leather. Spring 83 yieldingly resists movement of jaw 56 toward shaft 68, and washers 84 coact with washer 76 to prevent seepage of oil from the engine crank case into the starter housing.

The outer end of rod 80 preferably terminates at a point slightly beyond the outer end of sleeve 41 and is provided with a collar or flange 85 which constitutes an abutment for one end of a coil spring 86 that surrounds rod 80 within sleeve 41, the inner end of said spring bearing against the outer end of cranking shaft section 40.

A sleeve or connecting member 87 is pinned to the outer end of rod 80 and is of such size as to be freely movable within cranking rod section 47. A rod 88 is pinned at its inner end to the outer end of sleeve 87 and is of such length as to terminate at a point slightly beyond the outer end of cranking shaft section 47, said outer end being preferably provided with a removable button or head 89. As shown, rod 88 is slidably supported in the plane of pins 52 by a bushing 90 that is fitted into the outer end of the cranking shaft.

When it is desired to start the engine, the hand crank 53 is engaged with the cockpit end of the cranking shaft by means of pins 52. When so engaged, button 89 extends freely within a recess 53ª provided in said hand crank. Rotation of the crank is effective through the cranking shaft 40, 41, 47 and the train of gearing to rotate the flywheel. The elements within drum 34 including threaded shaft 68 and clutch jaw 56, rotate in unison with the barrel, said jaw being held out of driving engagement with jaw 54 by spring 86 and rod 80. After sufficient energy has been stored in the flywheel the hand crank 53 is disengaged from the cranking shaft and the operator forces rod 80, 88 inwardly against the tension of spring 86 by pressing on the button 89. Shoulder 81 is effective to move threaded shaft 68 to the left and the latter acts through spring 83 to move jaw 56 into full meshing engagement with jaw 54 whereupon starting torque is transmitted to the engine crank shaft. The multiple disc clutch constitutes a yielding driving connection between the flywheel and the engine crank shaft whereby the latter is gradually brought up to speed.

After the engine starts under its own power the speed of rotation of jaw 54 becomes greater than the speed of jaw 56 and the inclined faces of the teeth of said jaws are now effective to force jaw 55 to the right out of driving engagement with the engine jaw. When the operator releases button 89, spring 86 is effective to return rod 80, 88 to normal position whereby jaw 56 is positively held out of driving engagement with jaw 54. Since the meshing button 89 is housed within the hand crank when the latter is engaged with the cranking shaft it is impossible for the starter to be operatively connected with the engine at this time, said button being inaccessible until the hand crank is removed. Accidental starting of the engine is thereby prevented, as well as starting during the cranking operation.

There is thus provided novel engine starting means, said means being adapted for actuation from the cockpit of an aeroplane. The cranking shaft and the meshing rod are formed in sections whereby the starter may be readily removed from the engine without dismounting the portions of said shaft and rod which are mounted in and extend into the cockpit.

While the invention has been illustrated and described in connection with inertia starters only, it is to be expressly understood that the same is not limited to this type of starters, and reference will therefore be had to the appended claims for a definition of the limits of the invention.

What is claimed is:

1. In an engine starter of the type embodying a flywheel adapted to drive a member that is movable into engagement with a member of the engine to be started, a cranking shaft concentrically disposed with respect to the flywheel and having one end thereof projecting from said flywheel, and a rod for actuating said movable member, said rod being movable within said cranking shaft and having one end projecting beyond the end of said cranking shaft.

2. In an engine starter of the type embodying a flywheel adapted to drive a member which is movable into engagement with a member of the engine to be started, a housing for said starter, a cranking shaft extending freely through said flywheel and housing for manually rotating said flywheel, and a meshing rod slidably mounted within said cranking shaft and having one end thereof projecting from said shaft for manually moving said movable member into engagement with the engine member.

3. A flywheel starter for aeroplane engines of the type embodying a clutch member adapted for engagement with but normally disengaged from a member of the engine to be started, a housing for said starter, a cranking shaft for rotating said flywheel, said cranking shaft projecting through said housing, means in the aeroplane cockpit for rotatably supporting the outer end of said cranking shaft, and a meshing rod for said clutch member slidably mounted in said cranking shaft and having one end thereof projecting from the end of the cranking shaft to render said meshing rod accessible for direct manual operation.

4. In an engine starter of the type embodying a flywheel adapted to drive a clutch member that is movable into engagement with a member of the engine to be started, a housing for said starter, a hollow cranking shaft rotatably supported in said housing and having one end thereof projecting rearwardly from said housing, a meshing rod for said clutch member slidably mounted in said cranking shaft and having one end thereof projecting from said cranking shaft to render the same accessible for direct manual operation, a hand crank removably secured to the outer end of said cranking shaft, the extending end of said meshing rod projecting into a recess in said cranking shaft to render said rod inaccessible for operation during the actuation of said cranking shaft.

5. In an engine starter of the type embodying a flywheel adapted to drive a clutch member that is movable into engagement with a member of the engine to be started, a housing for said starter, a hollow cranking shaft concentrically mounted in said starter and having one end thereof projecting from said housing, a sleeve surrounding said cranking shaft and drivably connected thereto, a hollow member drivably connected to said sleeve, a hand crank removably secured to said hollow member, a meshing rod slidably disposed in said cranking shaft and hollow member, and resilient means for normally maintaining said meshing rod in a position such that one end thereof projects a predetermined distance from the outer end of said hollow member.

6. In an engine starter of the type embodying a flywheel adapted to drive a clutch member that is movable into engagement with a member of the engine to be started, a housing for said starter, a cranking shaft concentrically disposed with respect to said flywheel and having one end thereof projecting through said housing, a hand crank removably secured to the outer end of said cranking shaft, a meshing rod for said clutch member slidably mounted within said cranking shaft, said meshing rod having a shoulder formed thereon, and resilient means having engagement with said shoulder for normally maintaining said meshing rod in a predetermined position.

7. In an inertia starter for internal combustion engines, a meshing rod adapted to be manually operated, said rod being concentrically disposed relative to the starter and projecting therefrom, and a housing for the outer portion of said rod, said housing constituting a cranking shaft having a length less than the length of the rod.

8. In an inertia starter for internal combustion engines, a hollow cranking shaft, a meshing rod movably mounted therein, means for yieldingly maintaining said rod in a predetermined position relative to said shaft, and means for rendering said rod inaccessible during the cranking operation.

9. In an inertia starter for internal combustion engines, a hollow cranking shaft constituted by a plurality of drivably and detachably connected sections, means having a recess therein for rotating said shaft, said means being detachably connected to the shaft, a meshing rod constituted by a plurality of sections slidably mounted in said rod, one end of the rod projecting from said shaft into said recess, and means for rotatably mounting said shaft.

10. In an inertia starter for internal combustion engines of the type embodying a cylindrical housing constituted by inner and outer sections, a hollow cranking shaft formed in sections, the inner section of the shaft being rotatably mounted adjacent its opposite ends in the inner and outer housing sections and having one end projecting from said outer housing section, means detachably connected to the outer section of the cranking shaft for actuating the same, and a meshing rod slidably mounted in said shaft and having the outer end thereof projecting into said means.

11. In an internal combustion engine starter of the inertia type, a cranking shaft, a hand crank, pins carried by said shaft for drivably connecting the hand crank to the shaft, a meshing rod slidably mounted to said shaft, and a bushing positioned within the shaft in the plane of said pins for supporting the outer end of said rod.

12. In an engine starter of the type embodying a member movable into driving engagement with a member of the engine to be started, a cranking shaft, a rod slidably mounted in the cranking shaft and adapted to actuate said movable member, and a removable hand crank for actuating said cranking shaft, the engagement of the hand crank with the cranking shaft rendering said rod inaccessible.

13. In a starter for internal combustion engines, a member movable into engagement with a member of the engine to be started, a cranking shaft operatively connected to said movable member, means including a rod for moving said first named member into engagement with the engine member, said rod being mounted within said cranking shaft and having one end thereof projecting from the shaft, and a hand crank removably connected to the cranking shaft at the end of the latter from which said rod projects, the engagement of the hand crank with said cranking shaft rendering the rod inaccessible for actuation.

14. In an engine starter of the type embodying a cranking shaft, means for drivably connecting the starter with a member of the engine to be started, said means including a rod movably mounted in the cranking shaft, and a cranking member removably connected to said shaft for actuating the latter, the engagement of the cranking member with said shaft rendering the rod inaccessible for actuation.

In testimony whereof I have signed this specification.

RAYMOND P. LANSING.